(12) United States Patent
Weigl et al.

(10) Patent No.: US 8,662,568 B2
(45) Date of Patent: Mar. 4, 2014

(54) VEHICLE BODY STRUCTURE IN THE REGION OF THE A-PILLAR AND THE WINDSHIELD CROSS MEMBER AND ASSOCIATED PRODUCTION METHOD

(75) Inventors: Willibald Weigl, Zandt (DE); Martin Schromm, Gaimersheim (DE); Nils Oleff, Ingolstadt (DE); Stephan Gülich, Wettstetten (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/496,169

(22) PCT Filed: Jul. 10, 2010

(86) PCT No.: PCT/EP2010/004218
§ 371 (c)(1),
(2), (4) Date: Mar. 14, 2012

(87) PCT Pub. No.: WO2011/032614
PCT Pub. Date: Mar. 24, 2011

(65) Prior Publication Data
US 2012/0175915 A1   Jul. 12, 2012

(30) Foreign Application Priority Data
Sep. 18, 2009   (DE) .......................... 10 2009 042 189

(51) Int. Cl.
*B62D 25/04*   (2006.01)
(52) U.S. Cl.
USPC ................................. 296/193.06; 296/187.09
(58) Field of Classification Search
USPC ........ 296/193.06, 193.09, 187.09, 187.1, 192
See application file for complete search history.

(56) References Cited

U.S. PATENT DOCUMENTS

| 4,146,263 | A |   | 3/1979 | Watari |
|---|---|---|---|---|
| 5,586,799 | A | * | 12/1996 | Kanemitsu et al. ...... 296/193.06 |
| 6,322,124 | B1 | * | 11/2001 | Kim ............................... 296/30 |

FOREIGN PATENT DOCUMENTS

| DE | 195 34 568 | 4/1996 |
|---|---|---|
| DE | 29916467 | 1/2000 |
| DE | 198 43 824 | 3/2000 |
| DE | 100 23 506 | 10/2001 |
| DE | 102005050951 | 5/2007 |
| EP | 1647470 | 4/2006 |
| EP | 1655210 | 2/2008 |
| EP | 2039593 | 8/2008 |
| GB | 2 204 285 | 11/1988 |
| WO | WO2008000983 | 1/2008 |

* cited by examiner

*Primary Examiner* — Joseph Pape
*Assistant Examiner* — Dana Ivey
(74) *Attorney, Agent, or Firm* — Henry M Feiereisen LLC

(57) ABSTRACT

The invention relates to a vehicle body structure in the region of the A-pillar and the windshield cross member, including an A-pillar on both sides of the body, wherein in the pillar construction of the A-pillar, the A-pillar has an A-pillar inner steel plate oriented approximately vertically and in the vehicle longitudinal direction. An approximately horizontal windshield cross member is connected at the ends thereof to the associated A-pillar inner steel plate by means of a welded connection. According to the invention, the windshield cross member is produced as a composite component made of an elongated aluminum beam having steel plate adapter parts that extend the aluminum beam at the ends thereof but are short in comparison to the overall beam length, and the steel plate adapter parts are connected to the associated A-pillar inner steel plate by means of the welded connection and to the aluminum beam by means of a riveted connection.

18 Claims, 1 Drawing Sheet

VEHICLE BODY STRUCTURE IN THE REGION OF THE A-PILLAR AND THE WINDSHIELD CROSS MEMBER AND ASSOCIATED PRODUCTION METHOD

CROSS-REFERENCES TO RELATED APPLICATIONS

This application is the U.S. National Stage of International Application No. PCT/EP2010/004218, filed Jul. 10, 2010, which designated the United States and has been published as International Publication No. WO 2011/032614 and which claims the priority of German Patent Application, Serial No. 10 2009 042 189.0, filed Sep. 18, 2009, pursuant to 35 U.S.C. 119(a)-(d).

BACKGROUND OF THE INVENTION

The invention relates to a vehicle body structure in the region of the A-pillar and the windshield cross member as well as to an associated manufacturing process.

In a generic conventional, generally known construction, the respectively opposing A-pillars are formed from sheet steel and have an A-pillar inner steel plate which is oriented roughly vertically and in the longitudinal direction of the vehicle. The roughly horizontally positioned windshield cross member is also made from sheet steel and connected end-side to the associated A-pillar inner steel plate with a welding connection.

In modern vehicle bodies, materials made from light metals or light metal alloys, in particular aluminum are increasingly used to reduce fuel consumption by saving weight. The stiffness and joining technologies for light metal components differ from the previous conventional exclusive sheet steel construction so that problems arising from this circumstance have to be solved with a material mix which is exactly tailored to the respective site of the vehicle body and with a corresponding combination of components as well as cost-saving measures for use in large series production.

In this context, it is known to use a composite vehicle body panel (DE 198 43 824 A1) which is made from a large area light metal element of the vehicle body skin and a steel element which reinforces the latter at its edge, which are connected to one another with a sealing seam by laser joining. Particularly in the final assembly the steel element can be connected to adjoining steel elements with conventional welding technique. The technique of laser joining of light metal to steel for producing the composite vehicle body panel used in this case requires only accessibility from one side of a lap joint and thus allows for clearance with regard to the accessibility compared to other known joining techniques, for example rivets, which require accessibility from both sides. The laser joining technique, however, is elaborate and cost-intensive and therefore can be used in large series production only to a limited extend.

It is an object of the invention to refine a generic conventional vehicle body structure in the region of the A-pillar and the windshield cross member to provide for a weight-efficient construction having the required stiffness and which is suited for use in large series production with appropriate joining techniques.

SUMMARY OF THE INVENTION

This object is solved in that the windshield cross member is produced as composite component from a longitudinal aluminum beam with respective end-side steel plate adapter elements which extend the aluminum beam which, however, are short compared to the overall length of the beam. On one hand, the steel plate adapter parts are each connected to the associated A-pillar inner sheet metal by a welding connection and on the other hand to the aluminum beam by a rivet connection. Rivet connections for joining light metal elements and steel elements have proved to be stable, cost-effective connections which are especially appropriate for vehicle body construction and which are adaptable to the respective circumstances within broad ranges, and are also used in the present case. The weight reduction sought to be achieved with an aluminum beam compared to a steel beam as windshield cross member would be maximal if the entire windshield cross member was produced as aluminum beam. However, a connection of such an aluminum beam to a steel plate A-pillar with a rivet connection would not be possible in this case, because this would require access by a relatively large sized riveting tool from both sides, which is not available because multiple beam elements meet in the region of connection. To nevertheless allow using a cost-efficient advantageous rivet connection technique, relatively short steel plate adapter elements are connected on both sides of the longitudinal aluminum part by means of rivet connections. Such a windshield cross member can be advantageously produced already as pre-assembly module before final assembly. The steel plate adapter elements should be as short as possible and not longer than required for providing access for the riveting process, to reduce the weight advantage by the in comparison relatively long aluminum beam as little as possible. The steel plate adapter parts in particular in the final assembly can be easily connected to the A-pillar-steel plates via conventional welding connections.

The length of an adapter element corresponds to about 5% to 10% of the entire beam length and thus corresponds roughly to the size of a die of a punch riveting tool used for creating the rivet connection for a preferred punch rivet connection.

The A-pillar-inner steel plate, to which the windshield cross member is connected, can be formed by a lower A-pillar-bottom inner steel plate and an A-pillar-top inner steel plate connected to the latter, wherein their connection is located roughly at the height of and slightly below a window parapet. The windshield cross member is thereby connected to the lower region of the A-pillar top inner steel plate.

In a preferred embodiment, the aluminum beam is formed from an upper aluminum plate top beam and a lower aluminum plate bottom beam. The aluminum plate top beam and the steel plate adapter elements on both sides are connected by at least one rivet connection, wherein the steel plate adapter parts each abut the associated A-pillar inner steel plate with at least one bent welding flange, and a connection by means of at least one resistance spot welding is realized at this location. The aluminum plate bottom beam on the other hand is brought close to the A-pillar inner plate to abut the latter with at least one bent riveting flange, wherein a rivet connection can be directly realized at this location due to better accessibility.

For the further construction, an A-pillar outer sheet metal overlaps the A-pillar inner sheet metal from above and rests on the steel plate adapter part with a lap joint. The subjacent aluminum sheet bottom beam is provided with a through hole underneath this lap joint for inserting an electrode of welding tongs, so that the connection between the A-pillar-outer steel plate and the steel plate adapter part can be realized.

The above rivet connections are expediently generated by punch rivets, for which the strengths which is achievable by semi-tubular rivets is normally sufficient. Depending on the circumstances, punch rivets with solid rivets and optionally with an additional bonding at the associated lap joint can be provided for creating higher strengths and stiffness.

With regard to the manufacturing process, the object of the invention is solved in that the windshield cross member is produced as composite component from the aluminum beam and the steel plate adapter parts which are connected by means of the rivet connections. In the final assembly, the windshield cross member is then connected to the A-pillar inner steel plate with the steel plate adapter parts by resistance spot welding and optionally directly to the A-pillar outside steel plate with an aluminum plate bottom beam by rivet connections. An A-pillar outer steel plate is then connected to the respective steel plate adapter part by means of a resistance spot welding, optionally via a through hole on the aluminum plate bottom beam.

With such a process the required connections of the individual components can be produced easily and cost-efficiently.

BRIEF DESCRIPTION OF THE DRAWING

The invention is further explained with reference to a drawing.

It is shown in.

DETAILED DESCRIPTION OF PREFERRED EMBODIMENTS

Figure 1:
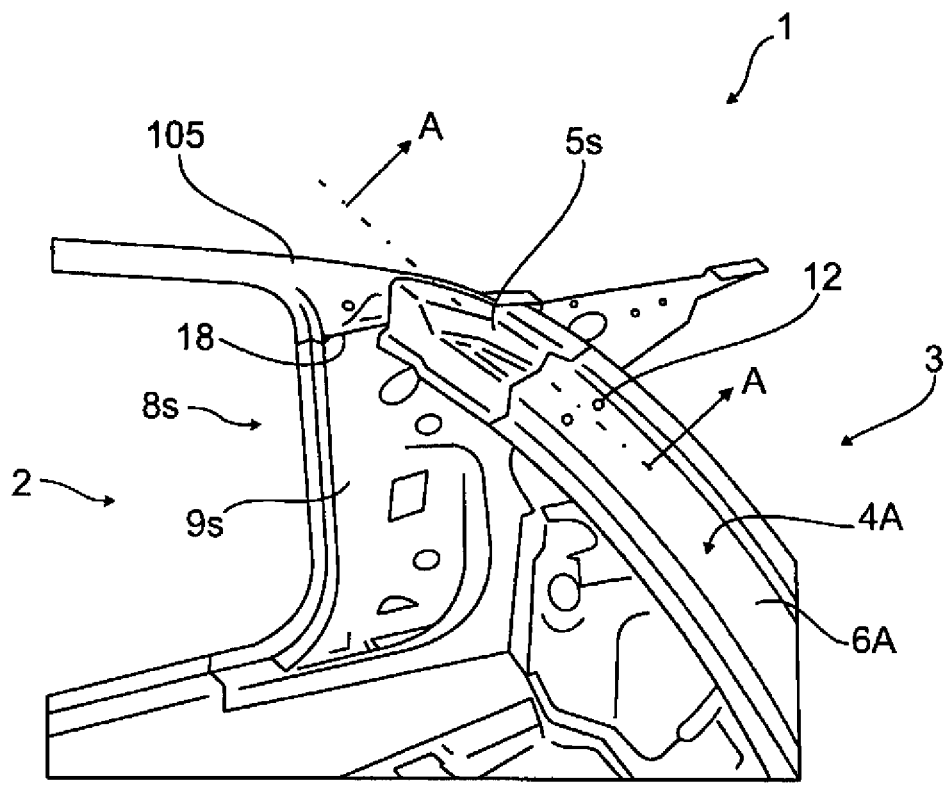
FIG. 1 a perspective schematic plan view onto the left interior of a vehicle body structure in the region of the A-pillar and the windshield cross member, and FIG. 2 a schematic section along the line A-A from FIG. 1.

FIG. 1 shows a schematic view obliquely from above onto a vehicle body structure in the interior region of the left A-pillar 2 and a windshield cross member 3 (partly shown). The windshield cross member 3 is produced as composite component from a longitudinal aluminum beam 4A and steel plate adapter parts 5S, each connected end-side (the reference sign index A indicates an aluminum part and the reference sign index S a steel part).

Figure 2:
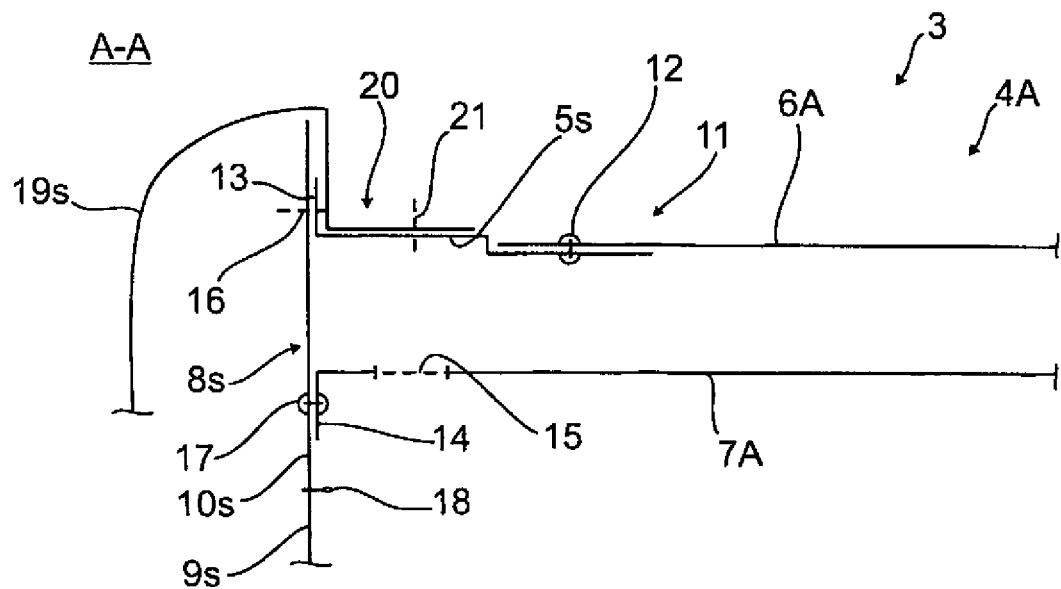

From the schematic section along the line A-A in a further concretization in FIG. 2 it can be seen that the aluminum beam 4A is formed from an aluminum plate top beam 6A and an aluminum plate bottom beam 7A. The steel plate adapter part 5S is connected to the aluminum plate top beam 6A for extending the latter.

The A-pillar 2 is formed from an A-pillar inner steel plate 8S which in turn is formed from a lower A-pillar top inner steel plate 9S and an upper A-pillar top inner steel plate 10S, wherein their connection 18 is positioned slightly below a window parapet. The windshield cross member 3 is connected to the A-pillar top inner steel plate 10S.

As can be seen from FIG. 2, the aluminum plate top beam 6A is extended end-side by the steel plate adapter part 5S and connected to a (schematically shown) semi-tubular rivet connection 12 at a lap joint 11. Additionally, the steel plate adapter part 5S has a welding flange 13 which is bent upward end-side. The aluminum plate bottom beam 7A corresponds in its length to the aluminum plate top beam 6A with the steel plate adapter parts 5S which are each connected end-side and has a downward bent rivet flange 14. Further, a respective through hole 15 is located underneath the steel plate adapter part 5S. The windshield cross member 3 can be produced as pre-assembly module.

For the final assembly both sides of the windshield beam 3 are then brought to abut the respective A-pillar top inner steel plate 10S with the welding flange 13 and the rivet flange 14 and joined at the welding flange 13 by a welding connection 16 and at the rivet flange 14 by a rivet connection 17 by means of punch rivets with semi-tubular rivets.

An A-pillar outer steel plate 19S which overlaps the A-pillar inner steel plate 8S from above is then attached, which rests on the steel plate adapter part 5S from above with a lap joint 20 above the through hole 15. This creates a welding connection 21 between the A-pillar outer steel plate 19S and the steel plate adapter part 5S by means of a resistance spot welding.

The invention claimed is:

1. A vehicle body structure, comprising:
   an A-pillar on either side of a body of a vehicle, said A-pillar having an A-pillar inner steel plate which is oriented approximately vertically and in a longitudinal direction of the vehicle; and
   a substantially horizontal windshield cross member having ends connected to the A-pillar inner steel plate by a welding connection, and being formed as a composite component comprised of a longitudinal aluminum beam and steel plate adapter parts which extend the longitudinal aluminum beam on opposite ends thereof and which are each defined by a length which is shorter than an overall length of the aluminum beam, wherein the steel plate adapter parts are connected to the aluminum beam by a rivet connection and to the A-pillar inner steel plate by a welding connection.

2. The vehicle body structure of claim 1, wherein the length of each of the steel plate adapter parts is about 5% to 10% of the overall length of the aluminum beam.

3. The vehicle body structure of claim 1, wherein the A-pillar inner steel plate is formed from an A-pillar bottom inner steel plate and an A-pillar top inner steel plate, said A-pillar top inner steel plate being connected to the A-pillar bottom inner plate, wherein the windshield cross member is connected to a lower region of the A-pillar top inner steel plate.

4. The vehicle body structure of claim 1, wherein the aluminum beam is formed from an upper aluminum plate top beam and a lower aluminum plate bottom beam, wherein the aluminum plate top beam and the steel plate adapter part are connected at a lap joint with at least one rivet connection, wherein each of the steel plate adapter parts has at least one bent welding flange and is connected to the A-pillar inner steel plate by the at least one bent welding flange at a site where the at least one bent welding flange abuts the A-pillar inner steel plate, wherein the aluminum plate bottom beam abuts the A-pillar inner steel plate with at least one bent rivet flange, and a rivet connection is formed at a site where the aluminum plate bottom beam abuts the A-pillar inner steel plate.

5. The vehicle body structure of claim 4, further comprising an A-pillar outer steel plate for each A-pillar inner steel plate, said A-pillar outer steel plate overlapping the A-pillar inner steel plate and resting on one of the steel plate adapter parts from above to form a lap joint, wherein the aluminum bottom beam is provided with a through hole underneath the lap joint for receiving an electrode of welding tongs for connecting the A-pillar outer steel plate to the steel plate adapter part by resistance spot welding.

6. The vehicle body structure of claim 2, wherein the rivet connection is implemented by punch rivets.

7. The vehicle body structure of claim 2, wherein the rivet connection is implemented by semi-tubular rivets.

8. The vehicle body structure of claim 2, wherein the rivet connection is implemented by solid rivets and additional bonding at the lap joint.

9. A method for manufacturing a vehicle body structure in a region of an A-pillar of a body of a vehicle, comprising:
  forming a windshield cross member as a composite component configured a as a pre-assembly module from an aluminum beam and steel adapter parts by connecting the aluminum beam and the steel adapter parts with a rivet connection; and
  connecting the windshield cross member in a final assembly to an A-pillar inner steel plate with the steel plate adapter parts by resistance spot welding.

10. The method of claim 9, further comprising directly connecting an aluminum plate bottom beam of the windshield cross member to the A-pillar inner steel plate by a rivet connection.

11. The method of claim 9, further comprising connecting a respective A-pillar outer steel plate to each of the steel plate adapter parts by resistance spot welding via a through hole.

12. The method of claim 11, wherein the windshield cross member includes an aluminum plate bottom beam, wherein the respective A-pillar outer steel plate overlaps the A-pillar inner steel plate and rests on one of the steel plate adapter part from above to form a lap joint, and wherein the aluminum bottom beam is provided with the through hole underneath the lap joint for inserting an electrode of welding tongs for performing said connecting step.

13. The method of claim 9, wherein each of the steel plate adapter parts is defined by a length which is about 5% to 10% of an overall length of the aluminum beam.

14. The method of claim 9, wherein the A-pillar inner steel plate is formed from an A-pillar bottom inner steel plate and an A-pillar top inner steel plate, said A-pillar top inner steel plate being connected to the A-pillar bottom inner plate, wherein the windshield cross member is connected to a lower region of the A-pillar top inner steel plate.

15. The method of claim 9, wherein the aluminum beam is formed from an upper aluminum plate top beam and a lower aluminum plate bottom beam, wherein the aluminum plate top beam and the steel plate adapter part are connected at a lap joint with at least one rivet connection, wherein the steel plate adapter part has at least one bent welding flange and is connected to the A-pillar inner steel plate by the at least one bent welding flange at a site where the at least one bent welding flange abuts the A-pillar inner steel plate, wherein the aluminum plate bottom beam abuts the A-pillar inner steel plate with at least one bent rivet flange, and a rivet connection is formed at a site where the aluminum plate bottom beam abuts the A-pillar inner steel plate.

16. The method of claim 9, wherein the rivet connection is implemented by punch rivets.

17. The method of claim 9, wherein the rivet connection is implemented by semi-tubular rivets.

18. The method of claim 9, wherein the rivet connection is implemented by solid rivets and an additional bonding at the lap joint.

* * * * *